United States Patent
Marinelli (10) Patent No.: US 8,438,784 B1
(45) Date of Patent: May 14, 2013

(54) AUTOMATED VEHICLE CARGO DOOR OPENER

(76) Inventor: Vittorio Marinelli, Deerfield Beach, FL (US)

( * ) Notice: Subject to any disclaimer, the term of this patent is extended or adjusted under 35 U.S.C. 154(b) by 34 days.

(21) Appl. No.: 12/972,469

(22) Filed: Dec. 18, 2010

Related U.S. Application Data (60) Provisional application No. 61/288,279, filed on Dec. 19, 2009.

(51) Int. Cl.
*B60J 5/10* (2006.01)

(52) U.S. Cl.
USPC .......................... 49/199; 296/186.4

(58) Field of Classification Search ............ 49/197, 49/199, 449; 160/201; 296/155, 186.4
See application file for complete search history.

(56) References Cited

U.S. PATENT DOCUMENTS

| | | | | |
|---|---|---|---|---|
| 2,097,950 A * | 11/1937 | Johnson | ........................ | 160/189 |
| 2,327,778 A * | 8/1943 | Wolf et al. | ..................... | 160/209 |
| 2,577,348 A * | 12/1951 | McLaughlin | .................. | 49/200 |
| 2,703,235 A * | 3/1955 | Reamey | ........................ | 160/193 |
| 2,982,541 A * | 5/1961 | Brady | ............................ | 49/140 |
| 3,543,441 A * | 12/1970 | Porte | ................................ | 49/450 |
| 3,708,917 A * | 1/1973 | Streeter | .......................... | 49/280 |
| 4,414,778 A * | 11/1983 | Carli | ............................... | 49/199 |
| 4,597,428 A * | 7/1986 | Iha | ................................ | 160/188 |
| 4,739,584 A * | 4/1988 | Zellman | .......................... | 49/199 |
| 4,821,456 A * | 4/1989 | Nogaki | ........................... | 49/362 |
| 4,860,813 A * | 8/1989 | Ballyns et al. | ................. | 160/188 |
| 4,884,831 A * | 12/1989 | Emon | ............................. | 292/38 |
| 4,891,908 A * | 1/1990 | Aquilina | ......................... | 49/199 |
| 4,905,542 A * | 3/1990 | Burm et al. | ...................... | 74/625 |
| 5,001,861 A * | 3/1991 | Hahn | ............................... | 49/280 |
| 5,056,847 A * | 10/1991 | Stillwell et al. | .................. | 296/50 |
| 5,080,409 A * | 1/1992 | Niswonger | .................... | 292/345 |
| 5,168,914 A * | 12/1992 | Keller | ............................ | 160/207 |
| 5,188,163 A * | 2/1993 | Schwartzengraber et al. | ........................... | 160/229.1 |
| 5,239,776 A * | 8/1993 | Lhotak | ............................ | 49/199 |
| 5,343,923 A * | 9/1994 | Keller | ............................ | 160/207 |
| 5,429,170 A * | 7/1995 | Nogaki | ........................... | 160/201 |
| 5,509,233 A * | 4/1996 | Peterson | ......................... | 49/139 |
| 5,544,691 A * | 8/1996 | Wandio | .......................... | 160/188 |
| 5,664,372 A * | 9/1997 | Williams et al. | ................. | 49/362 |
| 6,041,845 A * | 3/2000 | Couch | ............................ | 160/201 |
| 6,105,312 A * | 8/2000 | Lucas | ............................. | 49/200 |
| 6,179,036 B1 * | 1/2001 | Harvey | ........................... | 160/188 |
| 6,605,910 B2 * | 8/2003 | Mullet et al. | ................... | 318/264 |
| 7,076,917 B2 * | 7/2006 | Chang | ............................. | 49/139 |
| 7,111,895 B2 * | 9/2006 | Rivers et al. | ................... | 296/155 |
| 2002/0053411 A1 * | 5/2002 | Mochizuki | .................... | 160/201 |
| 2004/0140065 A1 * | 7/2004 | Hartmann | ...................... | 160/201 |
| 2004/0256064 A1 * | 12/2004 | Bennett et al. | ................. | 160/201 |

(Continued)

*Primary Examiner* — Katherine Mitchell
*Assistant Examiner* — Justin Rephann
(74) *Attorney, Agent, or Firm* — Allen D. Hertz, P.A.; Allen D. Hertz (57) ABSTRACT

An automated vehicle cargo door system comprises a cargo door comprising a plurality of panels hingeably assembled to one another, a pair of door tracks, a plurality of wheels rollingly assembling the door to the door tracks, a drive motor, a linear motion controller operably engaged with the drive motor, and a linkage removably engaging the linear motion controller and the cargo door. A release mechanism comprises an operational component located external to a vehicle cargo area. The release mechanism is in operative communication with the linkage, wherein the linkage can be disengaged from the linear motion controller by the release mechanism, thus allowing a user to open the cargo door should the motor become inoperable.

20 Claims, 12 Drawing Sheets

U.S. PATENT DOCUMENTS

| | | |
|---|---|---|
| 2005/0073173 A1* | 4/2005 | Belanger et al. ............... 296/155 |
| 2005/0120629 A1* | 6/2005 | Chang ............................. 49/197 |
| 2006/0027343 A1* | 2/2006 | Bennett et al. ................. 160/201 |
| 2008/0104889 A1* | 5/2008 | Chang ............................. 49/199 |
| 2009/0044454 A1* | 2/2009 | Meichtry ........................ 49/197 |

* cited by examiner

AUTOMATED VEHICLE CARGO DOOR OPENER

CROSS-REFERENCE TO RELATED APPLICATION

This application is a divisional application co-pending U.S. Provisional Patent Application Ser. No. 61/288,279, filed on Dec. 19, 2009, which is incorporated herein in its entirety.

FIELD OF THE INVENTION

The present invention relates to a vehicle security system, and more particularly, a door management system comprising a deadbolt door locking system and a roll up door automated door mechanism, each comprising an external emergency release allowing release of the lock should a failure occur in either mechanism.

BACKGROUND OF THE INVENTION

The invention pertains to a cargo vehicle security system comprising a deadbolt door locking system for each of a single door and a double door. The cargo vehicle security system further comprising an automated door opening system for opening a roll up door.

An overhead door opening system for use in conjunction with a roll up cargo door is known. The implementation has a variety of configurations. Each of the systems are limited should the overhead door opening system fail. The configuration of most cargo vehicles provides a single access to the cargo area, that being the roll up cargo door. Should the overhead door opening system fail, the system locks the user from accessing the cargo area.

The overhead door opening system allows the door to move vertically while the vehicle is traveling and passes across bumps or other vibration introducing features along the path of travel. The play in the overhead door opening system allows the cargo door to jump up and down, allowing smaller items to slide under the door, cause potential damage to the door or door opening system, and the like. The noise can be distracting to the driver or other occupants of the vehicle.

Several door locking deadbolt systems are known. Each of the deadbolt configurations secures the door to a vehicle frame member. The deadbolt and actuator can be secured to the door, with the deadbolt pin being moveably configured to engage with the frame member. Alternately, the deadbolt and actuator can be secured to the frame member, with the deadbolt pin being moveably configured to engage with the vehicle door. Should the locking system fail, leaving the deadbolt engaged and the door locked in a closed position. A failure would keep a driver from accessing the interior of the vehicle. A failure during an accident would keep rescue workers from accessing the occupants of the vehicle via the doors.

Accordingly, there remains a need in the art for a device that secures a vehicle, while allowing access to the secured compartments should the securing system fail.

SUMMARY OF THE INVENTION

The present invention overcomes the deficiencies of the known art and the problems that remain unsolved by providing a method and respective apparatus for securing a cargo vehicle.

In accordance with one embodiment of the present invention, the invention consists of a cargo roll up door opening system, the system comprising:

a roll up cargo door providing access to a cargo enclosed area;

an overhead door opening system comprising:
a drive motor,
a linear motion controlling mechanism;
a disengaging linkage providing a removably engaging coupling between the roll up cargo door and the linear motion controlling mechanism; and a release mechanism operationally located external to the cargo enclosed area and engaging with the disengaging linkage wherein the user can operate the release mechanism from outside the cargo enclosed area causing the disengaging linkage to disengage the coupling between the roll up cargo door and the linear motion controlling mechanism.

In one aspect, the release mechanism is a rotatable handle located on an exterior of the roll up cargo door.

Yet another aspect, the release mechanism utilizes a cable between an external operable element and the disengaging linkage.

While another aspect, the release mechanism utilizes a linkage between an external operable element and the disengaging linkage.

With yet another aspect, the linkage provided between the roll up cargo door and the linear motion controlling mechanism includes a limited sliding interface allowing the linear motion controlling mechanism to move a predetermined distance before engaging to move the roll up cargo door.

Yet another aspect, the limited sliding interface operates a door securing deadbolt interface.

Regarding another aspect, an actuator operates a door securing deadbolt interface engaging a deadbolt at a location to limit the vertical motion of the roll up cargo door by positioning the deadbolt to interfere with a motion of the wheel along the track.

In accordance with a second embodiment of the present invention, the invention consisting of:

a deadbolt actuating assembly having a deadbolt sliding mechanism for securing a door in a closed position against a door frame; and a mechanical safety release mechanism operationally located external to an enclosed area accessed via the door, wherein said mechanical safety release mechanism engages with the deadbolt sliding mechanism wherein the user can operate the mechanical safety release mechanism from outside the enclosed area causing the deadbolt sliding mechanism to disengage the coupling between the door and the door frame.

Yet another aspect, the mechanical safety release mechanism utilizes a cable between a release aiding member and the deadbolt sliding mechanism.

While another aspect, the mechanical safety release mechanism utilizes a mechanical linkage between a release aiding member and the deadbolt sliding mechanism.

In yet another aspect, the mechanical safety release mechanism further incorporates an inertial release activating mechanism wherein the inertial release activating mechanism ensures the deadbolt sliding mechanism is positioned in a disengaged configuration.

With another aspect providing a safety release mechanism integrated with an airbag activation sensor.

While another aspect utilizes a weight positioned within a containment member allowing for a horizontal plane motion of freedom.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
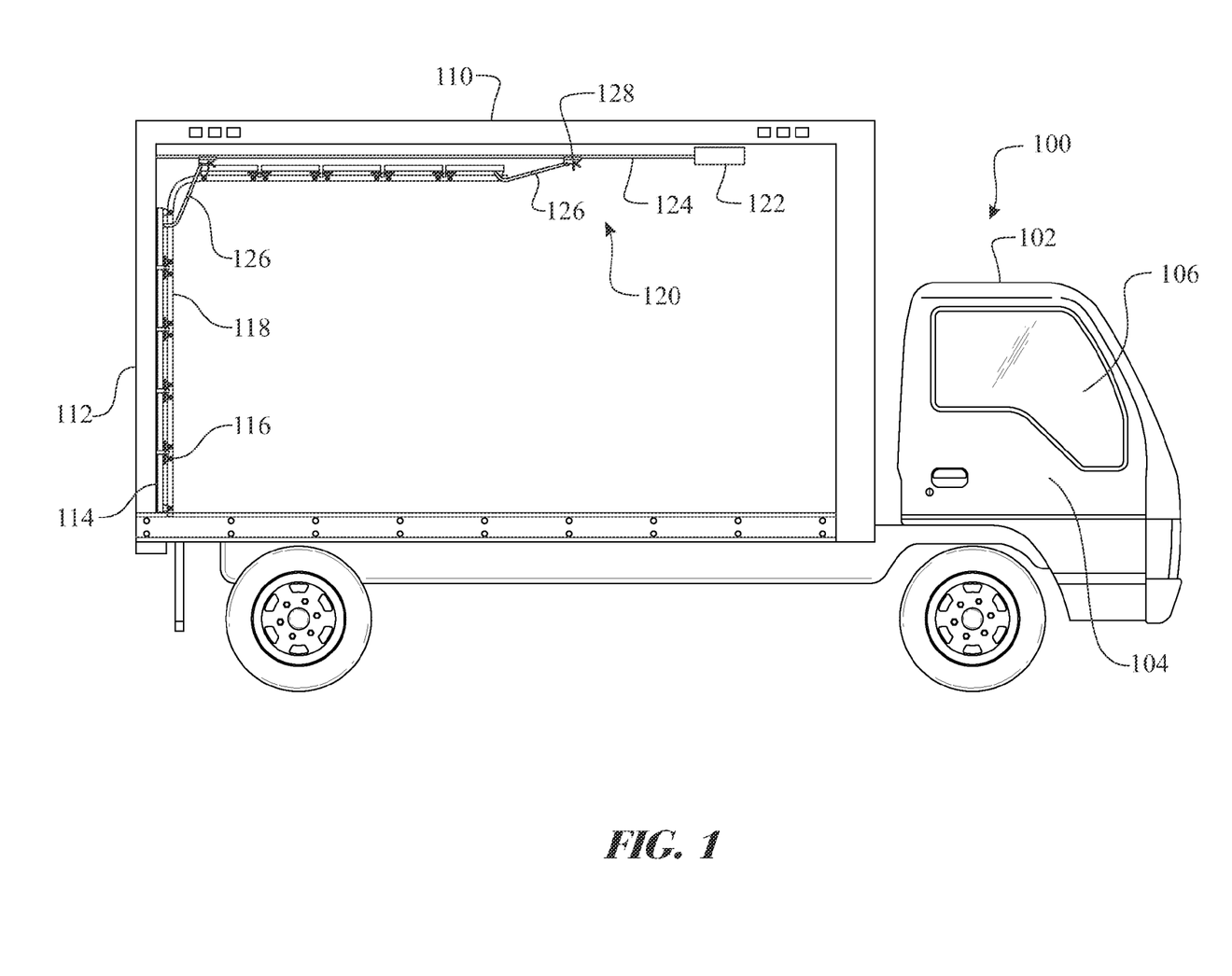
FIG. 1 presents a side, elevation view of an automated overhead door opening system integrated into a trailer portion of a cargo vehicle.

For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention integrates an automated door opening assembly 120 into a cargo vehicle 100. The cargo vehicle 100 includes commonly known features, such as a vehicle cab 102 and a cargo trailer 110 as presented in the exemplary illustration of FIGS. 1 and 2. The vehicle cab 102 is accessible via a vehicle door 104. A door window 106 is integrated into the vehicle door 104 providing visibility for the occupants. Contrarily, the door window 106 provides an easy access point for a criminal to obtain unauthorized entry into the vehicle cab 102. The cargo trailer 110 is accessible via a trailer access door 112; the trailer access door 112 commonly being a roll up door comprising a plurality of trailer roll up door panels 114. The plurality of trailer roll up door panels 114 is assembled via a series of door panel hinges 115. The trailer access door 112 comprises a series of door wheels 116 engaged in a roll up door track 118. The automated door opening assembly 120 maintains the trailer access door 112 at a fixed position, preferably either closed (as shown) or open (as understood). The automated door opening assembly 120 comprises an automated opener or drive motor 122 in communication with an opener track and drive assembly 124 (the drive assembly may alternately be referred to as a linear motion control assembly) for moveably positioning a linkage arm to door opening carriage or track engaging assembly 128. The drive assembly can be a screw drive, a chain drive, a cable drive, and the like, including the interface provided between the opener motor 122 and a linear motion means. An opener linkage arm 126 extends between and couples the linkage arm to track engaging assembly 128 and the trailer access door 112 for opening/closing the trailer access door 112, as well as maintaining the trailer access door 112 at a position. The automated opener motor 122 drives the opener track and drive assembly 124. The linkage arm to track engaging assembly 128 is engaged with the drive components of the opener track and drive assembly 124. The linkage arm to track engaging assembly 128 is connected to the trailer access door 112 via the opener linkage arm 126. The automated opener motor 122 operates and moves the drive components of the opener track and drive assembly 124, which drives the position of the linkage arm to track engaging assembly 128. The resulting motion opens or closes the trailer access door 112 accordingly. When the automated door opening assembly 120 is not in operation, the automated opener motor 122 remains stationary, thus maintaining the trailer access door 112 in position. The opener track and drive assembly 124 can utilize a chain drive, a cable dive, a screw drive, and the like. The automated opener motor 122 can operate via AC or DC current. The preferred embodiment utilizes DC current, thus avoiding the need for an inverter.

Figure 2:
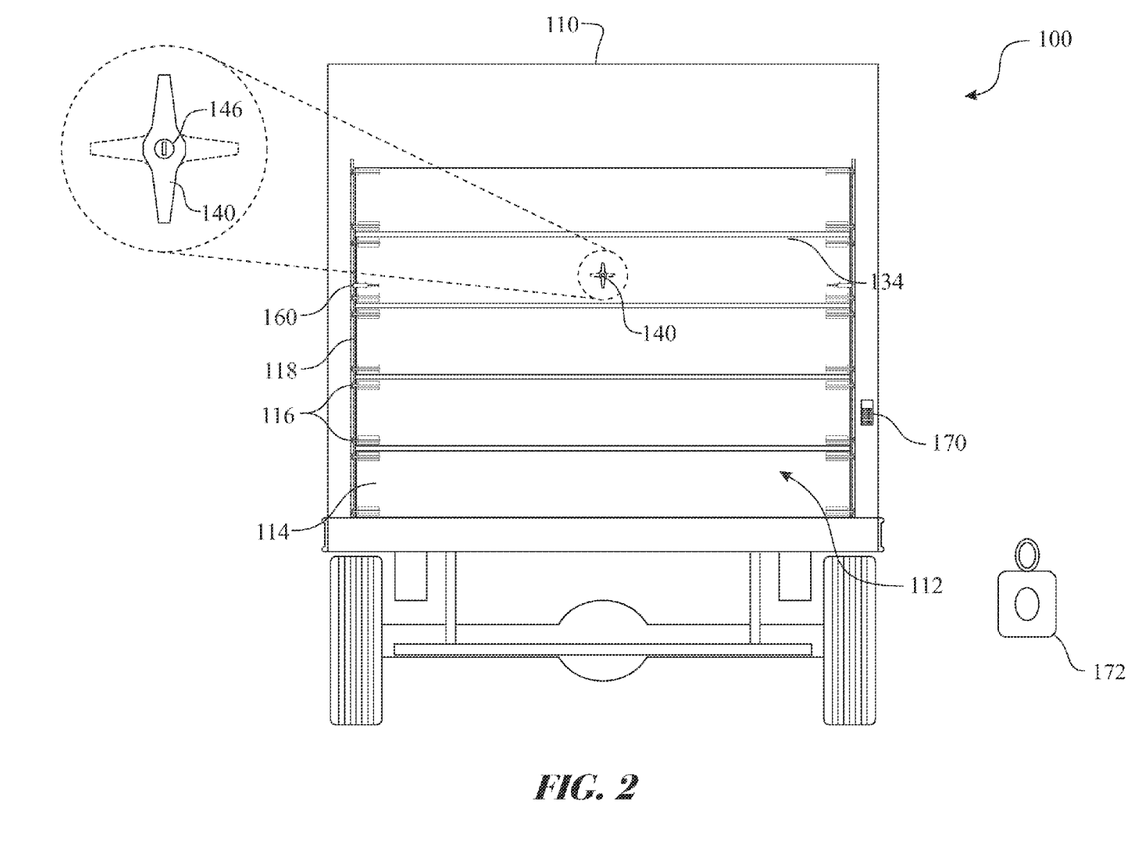
FIG. 2 presents a rear, elevation view of the trailer portion of a cargo vehicle of FIG. 1.
Figure 3:
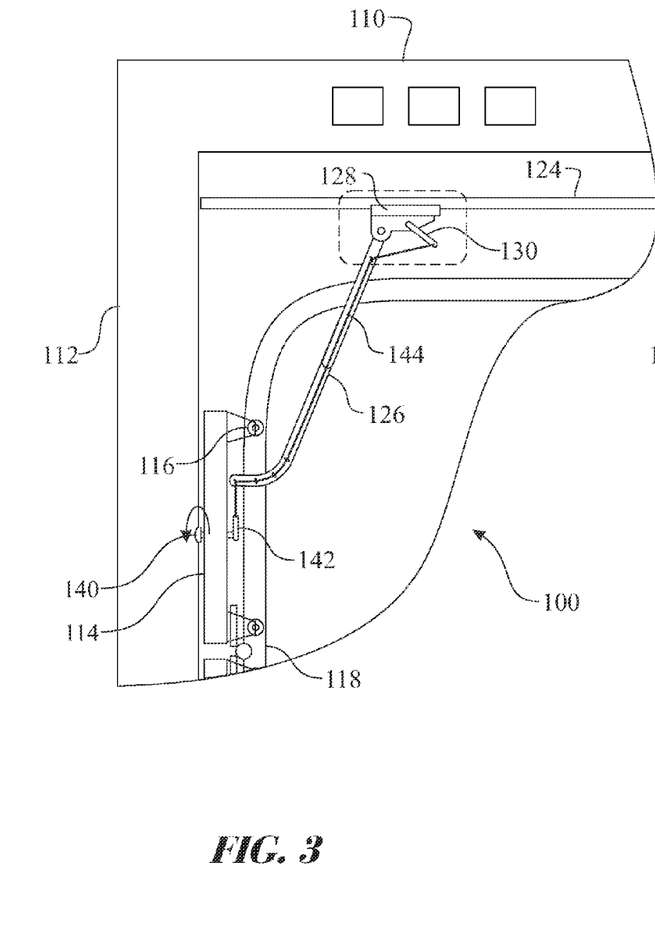
FIG. 3 presents a side, elevation view of an exterior release mechanism in communication with a disengaging linkage of the automated overhead door opening system, shown in an engaged configuration.
Figure 4:
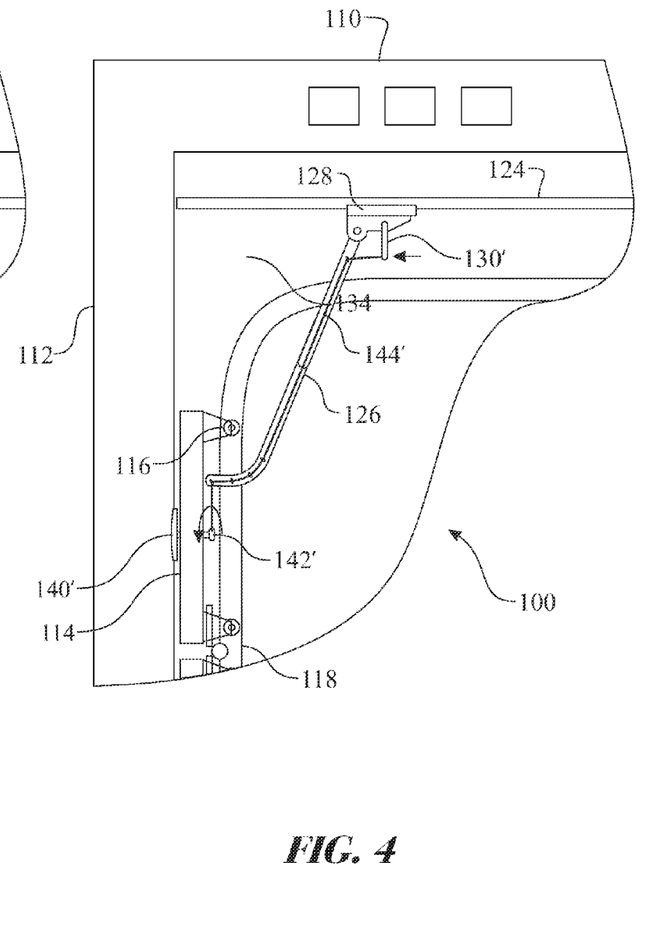
FIG. 4 presents a side, elevation view of the exterior release mechanism in communication with the disengaging linkage of the automated overhead door opening system, shown in a disengaged configuration.
Figure 5:
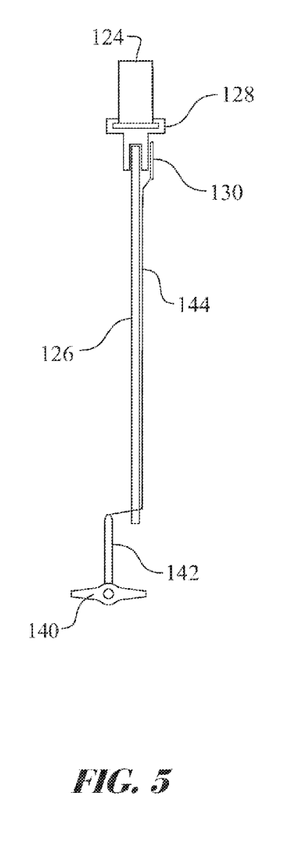
FIG. 5 presents a rear, elevation view of an exterior release mechanism in communication with a disengaging linkage of the automated overhead door opening system, shown in an engaged configuration.
Figure 6:
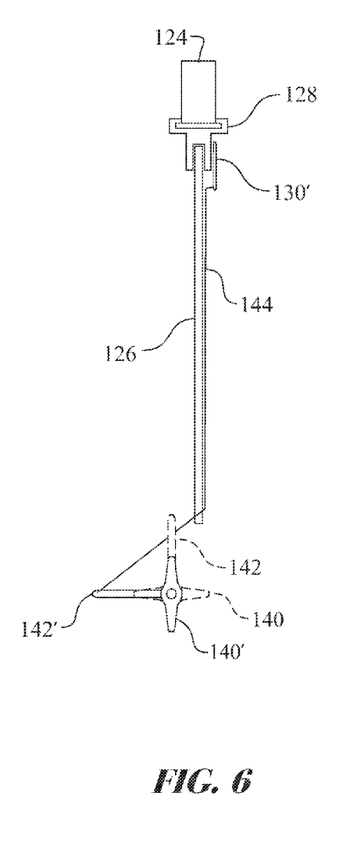
FIG. 6 presents a rear, elevation view of the exterior release mechanism in communication with the disengaging linkage of the automated overhead door opening system, shown in a disengaged configuration.

The trailer access door 112 is generally an assembly comprising a plurality of trailer roll-up door panels 114, as best illustrated in FIG. 2. Each of the trailer roll up door panel 114 utilizes a pair of door wheels 116 located on each of the outer edges of the trailer roll up door panel 114, preferably proximate the corners. A keypad remote 170 or a remote operation transmitter 172 can be used for operating the automated door opening assembly 120. The user can enter a code and any required instructions into the keypad remote 170. Upon verification of the entered information, the keypad remote 170 transmits an activation signal to a receiver in the automated opener motor 122. The automated opener motor 122 acts accordingly. Similarly, the user simply depresses an actuation button on the remote operation transmitter 172 to transmit a signal to the receiver in the automated opener motor 122. The remote operation transmitter 172 allows the driver to retrieve items from inside the cargo trailer 110, begin walking away and automatically lower the trailer access door 112. As the driver approaches the cargo vehicle 100, the user can utilize the remote operation transmitter 172 to open the trailer access door 112 such that the trailer access door 112 is opened when the driver arrives. An opener release handle 140 allows the driver to release the linkage arm to track engaging assembly 128 from the opener track and drive assembly 124, providing access to the cargo trailer 110 should the automated door opening assembly 120 fail. An automated locking assembly 160 can be provided to limit the motion of the trailer access door 112 as desired. Alternately, the remote operation transmitter 172 can be a proximity type device, whereby the system automatically detects when the remote operation transmitter 172 is within range and subsequently opens the door. When the system detects the remote operation transmitter 172 is out of range, the system begins a delay process to ensure the remote operation transmitter 172 is out of range. Upon verification that the remote operation transmitter 172 is out of range, the system closes the door.

Details of an exemplary emergency release system are presented in FIGS. 3 through 6 and 14. An engagement release lever 130 is used to engage and release the linkage arm to track engaging assembly 128 with the opener track and drive assembly 124. The linkage arm to track engaging assembly 128 includes a drive member mating component 132 operated by the engagement release lever 130. The engagement release lever 130 includes a mating component cam 131 that repositions the drive member mating component 132 in accordance with a drive member mating component engaging motion 136. In an engaged configuration (shown in solid lines), the mating component cam 131 engages drive member mating component teeth 134 of the drive member mating component 132 with a drive member 138 located within the opener track and drive assembly 124. In a disengaged configuration, (shown in broken lines), the mating component cam 131 disengages drive member mating component teeth 134 from the drive member 138. The linkage arm to track engaging assembly 128 comprises the components providing a removably engaging coupling, including the drive member mating component 132 in operational communication with the engagement release lever 130. The exemplary embodiment illustrates a commonly known screw drive configuration. It is understood that the system can be adapted to any drive configuration. The opener release handle 140 engages with the engagement release lever 130 via a release cable 144. The release cable 144 can be a cable, a linkage, or any other form of intermediary means, generally referred to as a release control element. The release cable 144 can be actuated via a cam such as a release operable arm 142 attached to the opener release handle 140. When the driver rotates the opener release handle 140 into a release position opener release handle 140' (FIGS. 4 and 6), the release operable arm 142 is rotated into a release position release operable arm 142', pulling the release cable 144'. The release cable 144' (released configuration) positions the engagement release lever 130' in the respective released configuration. The opener release handle 140 can include a lock 146 to ensure against disengagement of the linkage arm to track engaging assembly 128 by an unauthorized party. It is understood that any form factor for a release mechanism that is operable from the exterior of the cargo trailer 110 is desirable. Other exemplary means includes a simple pull ring. The pull ring can be provided positioning a locking bar through the ring.

Figure 7:
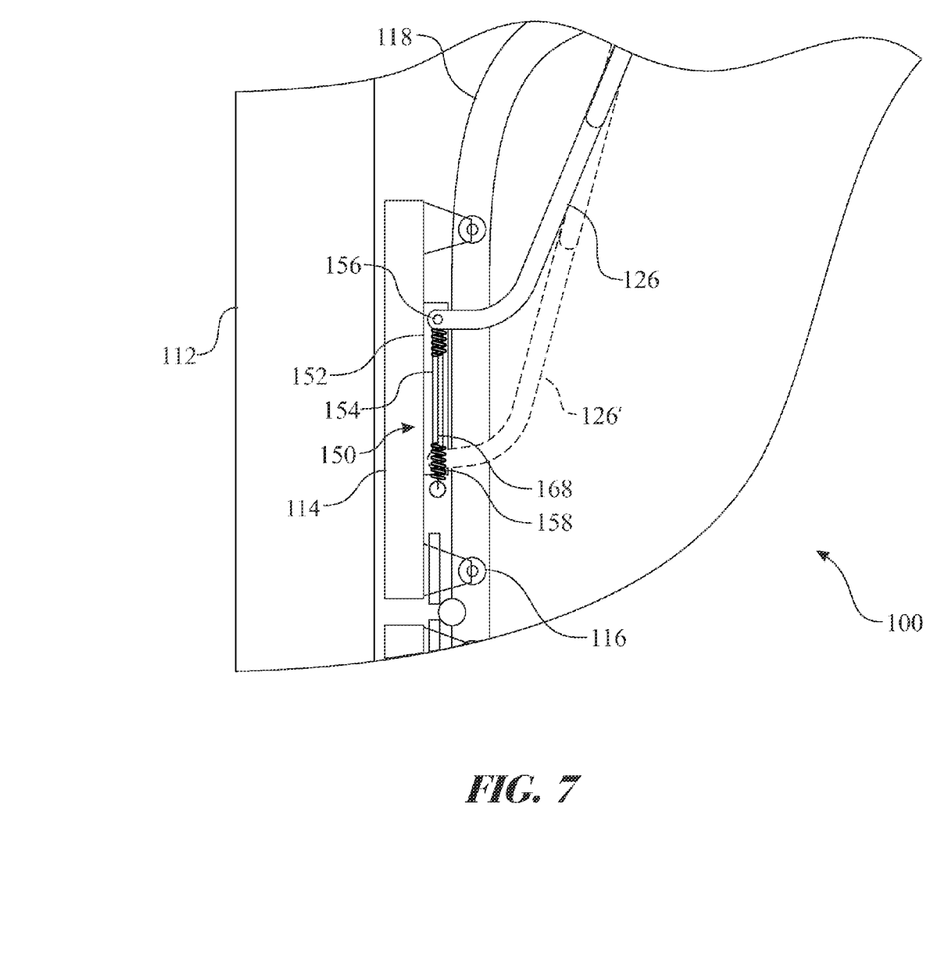
FIG. 7 presents a side, elevation view of a linkage arm and linkage bracket comprising a slideable engaging interface.
Figure 8:
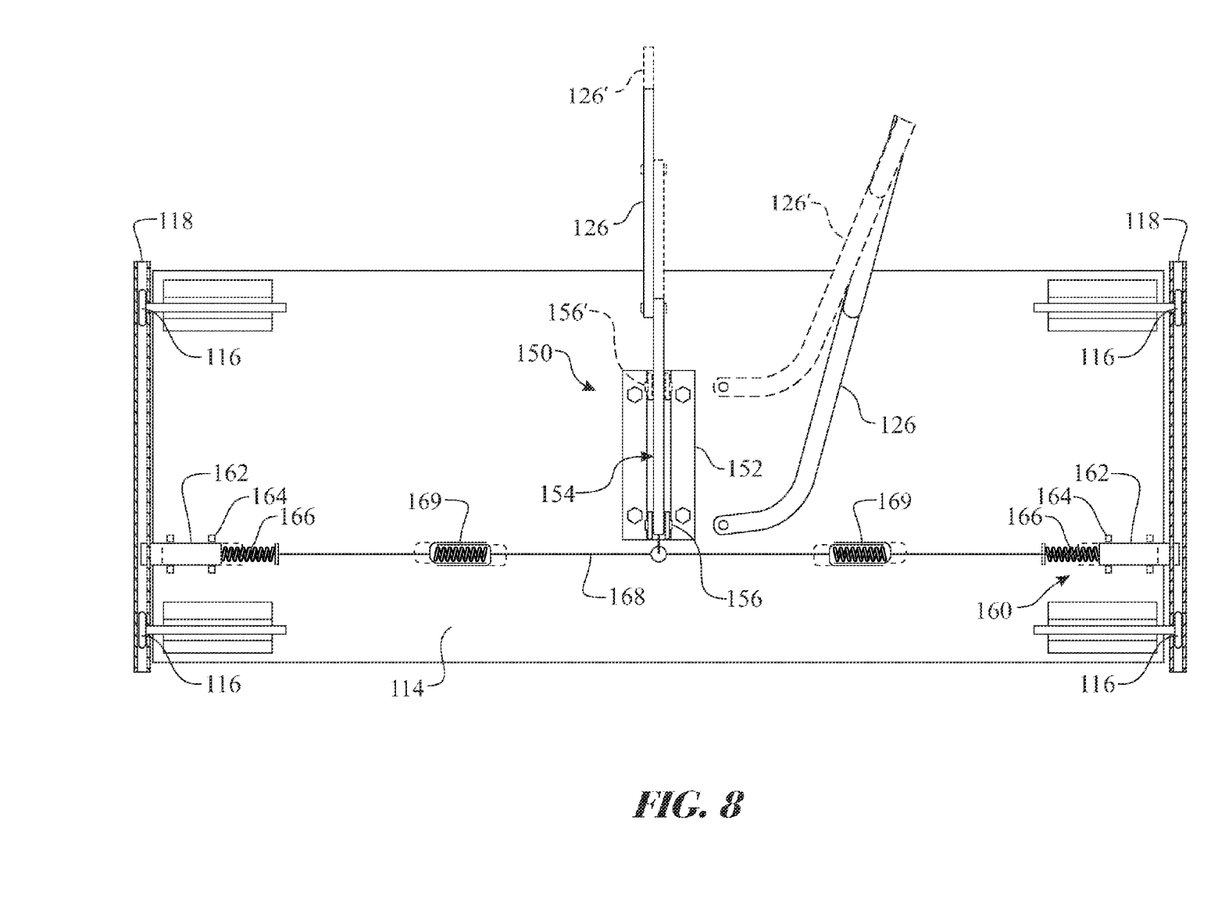
FIG. 8 presents a front, elevation view of a linkage arm and linkage bracket comprising a slideable engaging interface of FIG. 8.

A slip linkage bracket assembly 150 can be integrated into the automated door opening assembly 120. The slip linkage bracket assembly 150 allows the opener linkage arm 126 to move between a lockdown position referenced as 126' and a door lift position referenced as 126. The slip linkage bracket assembly 150 is fabricated having a linkage arm bracket 152 with a vertical slot 154 arranged vertically therethrough. A linkage pin 156 is disposed through the engaging end of the opener linkage arm 126. The linkage pin 156 is slideably positioned through the vertical slot 154 of the linkage arm bracket 152. A linkage biasing member 158 (the upper and lower portions being illustrated with the center removed for presentation purposes) can be assembled maintaining the opener linkage arm 126 in a raised position. The slideable engagement between the opener linkage arm 126 and the linkage arm bracket 152 allows the automated door opening assembly 120 to partially move independently of the trailer access door 112. This difference in movement can allow for a variety of operations. A first option would be the inclusion of an automated locking assembly 160. The automated locking assembly 160 provides a deadbolt lock by automatically engaging a deadbolt locking bar 162 with a receiving aperture within the roll up door track 118 to create a mechanical lock between the trailer access door 112 and the roll up door track 118. A locking bar bracket 164 guides and maintains the orientation of the deadbolt locking bar 162. A locking bar biasing member 166 ensures the locking assembly control cable 168 remains in a tensile state. As the opener linkage arm 126 moves to an opening position, referenced as 126', the opener linkage arm 126 pulls the locking assembly control cable 168 upwards placing the linkage pin 156 in a position against an upper edge of the vertical slot 154, referenced as 156'. The applied tension to the locking assembly control cable 168 causes the deadbolt locking bar 162 to disengage from the roll up door track 118. A cable expansion assembly 169 can be provided along the locking assembly control cable 168 to compensate for tolerances, shock, and the like. The exemplary cable expansion assembly 169 is a biased expansion assembly. When the trailer access door 112 is lowered, the opener linkage arm 126 removes the tension from the locking assembly control cable 168, thus the locking bar biasing member 166 biases the deadbolt locking bar 162 to engage with the aperture of the roll up door track 118. An emergency release handle (similar to the opener release handle 140) can be integrated with the locking assembly control cable 168 should the automated door opening assembly 120 or other operable element fail. It is understood that the sliding engaging design (as shown) can alternately be operable via a pivotal motion to engage and disengage the locking bar from the track. The locking bar would pivot between a locked and an unlocked orientation.

Figure 9:
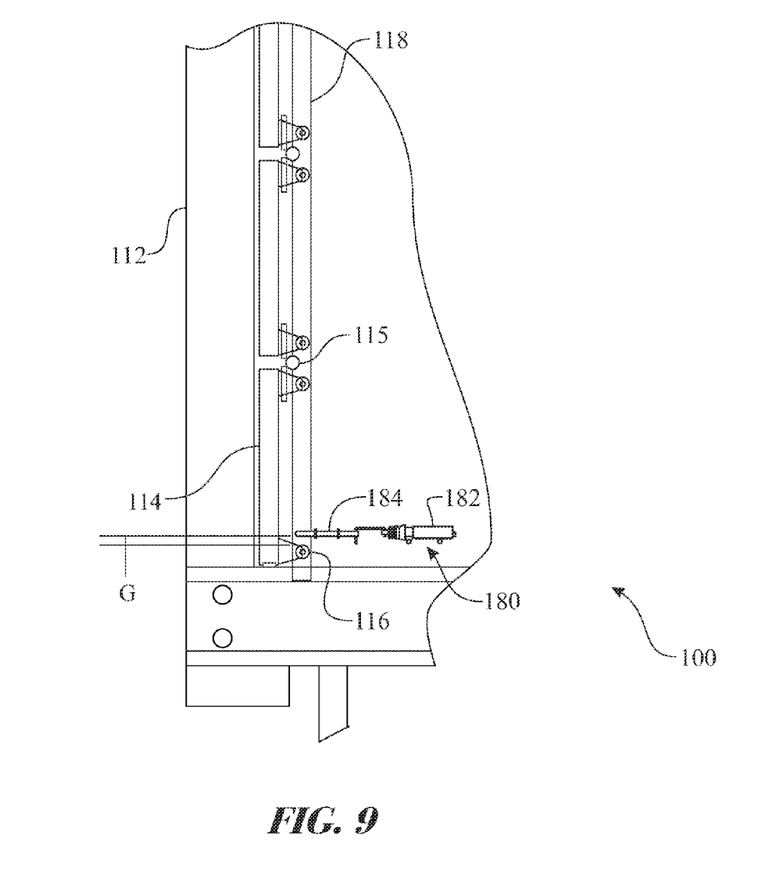
FIG. 9 presents a side, elevation view of an actuator and deadbolt assembly installed at a location to limit the vertical motion of the roll up cargo door by positioning the deadbolt to interfere with a motion of the wheel along the track.
Figure 10:
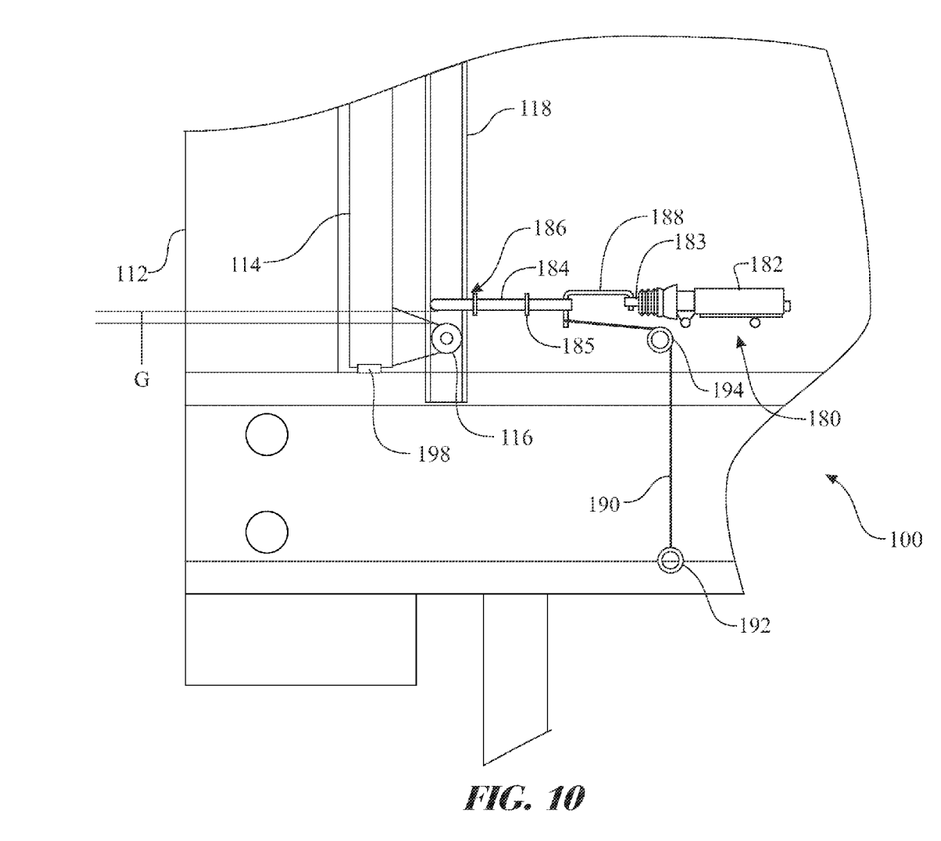
FIG. 10 presents a detailed view of the actuator and deadbolt assembly of FIG. 9, further illustrating an exemplary emergency release mechanism.

A remote deadbolt assembly 180, as illustrated in FIGS. 9 and 10, can be integrated as an alternative to the automated locking assembly 160. The remote deadbolt assembly 180 includes a deadbolt actuator 182 for operating a deadbolt pin 184. The deadbolt pin 184 is slideably assembled through a deadbolt bracket 185, wherein the deadbolt bracket 185 provides support and registration of the deadbolt pin 184 to a deadbolt receiving aperture 186 through the roll up door track 118. The deadbolt actuator 182 moves an actuating arm 183. A linkage arm 188 provides connectivity between the actuating arm 183 and the deadbolt pin 184. The deadbolt pin 184 is inserted above a contacting surface of the door wheels 116 at a distance identified as gap "G". The gap "G" allows an unauthorized party to move the trailer access door 112 upwards allowing a proximity alarm sensor 198 to change state. An emergency release cable 190 is included, as a component of the remote deadbolt assembly 180 allowing a party to disengage the deadbolt pin 184 from the deadbolt receiving aperture 186 should the deadbolt actuator 182 or another component fail. A release ring 192 can be provided at a distal end of the emergency release cable 190, aiding the party in pulling the emergency release cable 190. At least one redirecting element 194 can be utilised to redirect the emergency release cable 190 as desired to properly disengage the deadbolt pin 184 from the deadbolt receiving aperture 186. The release ring 192 can be secured via a locking bar to ensure against unauthorized disengagement.

The trailer access door 112 is one of several potential access means to the cargo vehicle 100. Security is required at all access means to properly secure the cargo vehicle 100. A two-door security configuration is presented in FIG. 11, with exemplary detailed embodiments being presented in FIGS. 12 and 13. An exemplary vehicle door assembly 200 demonstrates several potential locking means for securing a primary door 202 and a secondary door 204. Each door 202, 204 generally includes a door window 206, which unfortunately, provides an access means for an unauthorized party. The unauthorized party could break the door window 206, allowing the party to unlock the door and simply open the primary door 202 via a door handle 208. The primary door 202 overlaps a mating edge of the secondary door 204, thus only requiring a means for securing the primary door 202.

Figure 11:
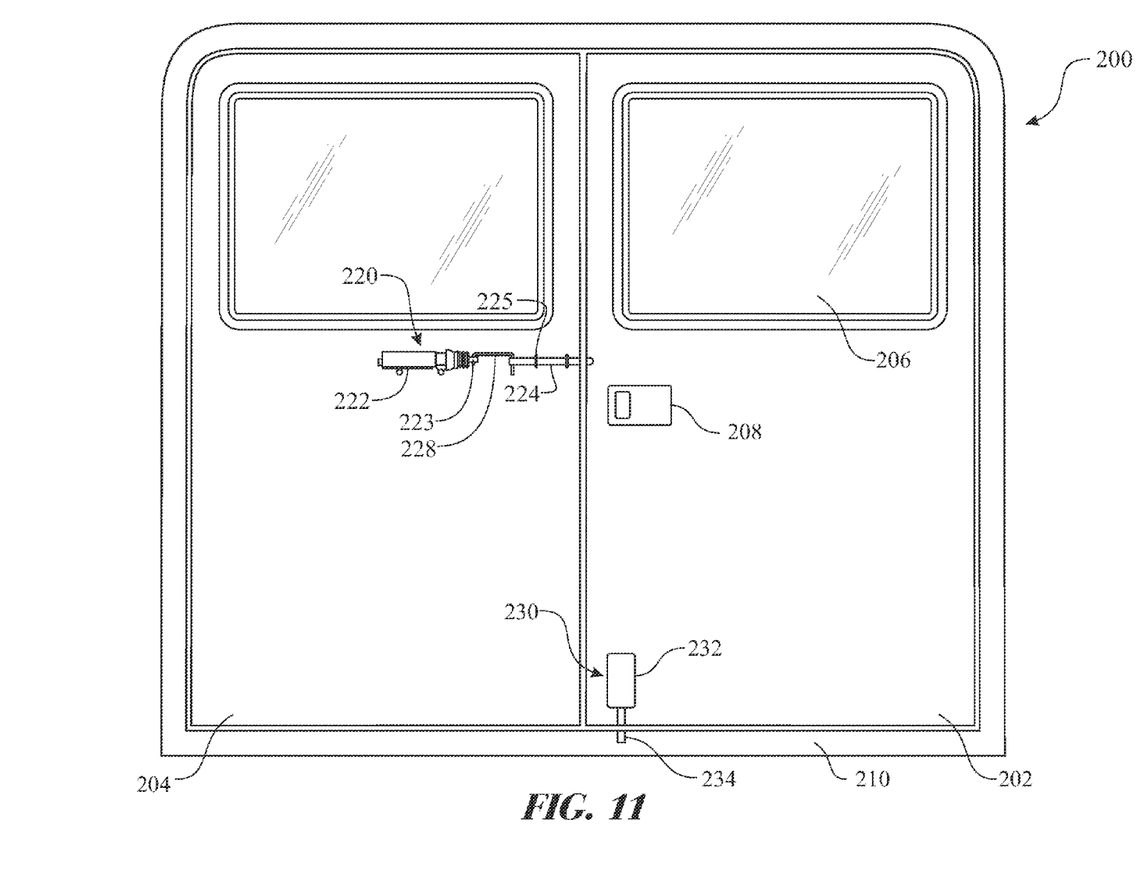
FIG. 11 presents two exemplary actuator deadbolt locking embodiments for securing a vehicle door.

The vehicle door assembly 200 can be secured via either a door-to-door deadbolt assembly 220 or a door to frame deadbolt assembly 230. The door-to-door deadbolt assembly 220 comprises a configuration similar to the remote deadbolt assembly 180 (FIGS. 9 and 10). The door-to-door deadbolt assembly 220 includes a deadbolt actuator 222 for operating a deadbolt pin 224. The deadbolt pin 224 is slideably assembled through a deadbolt bracket 225, wherein the deadbolt bracket 225 provides support and registration of the deadbolt pin 224 to an aperture provided in the adjacent door (or doorframe for a single door). The deadbolt actuator 222 moves an actuating arm 223. A linkage arm 228 provides connectivity between the actuating arm 223 and the deadbolt pin 224.

Figure 12:
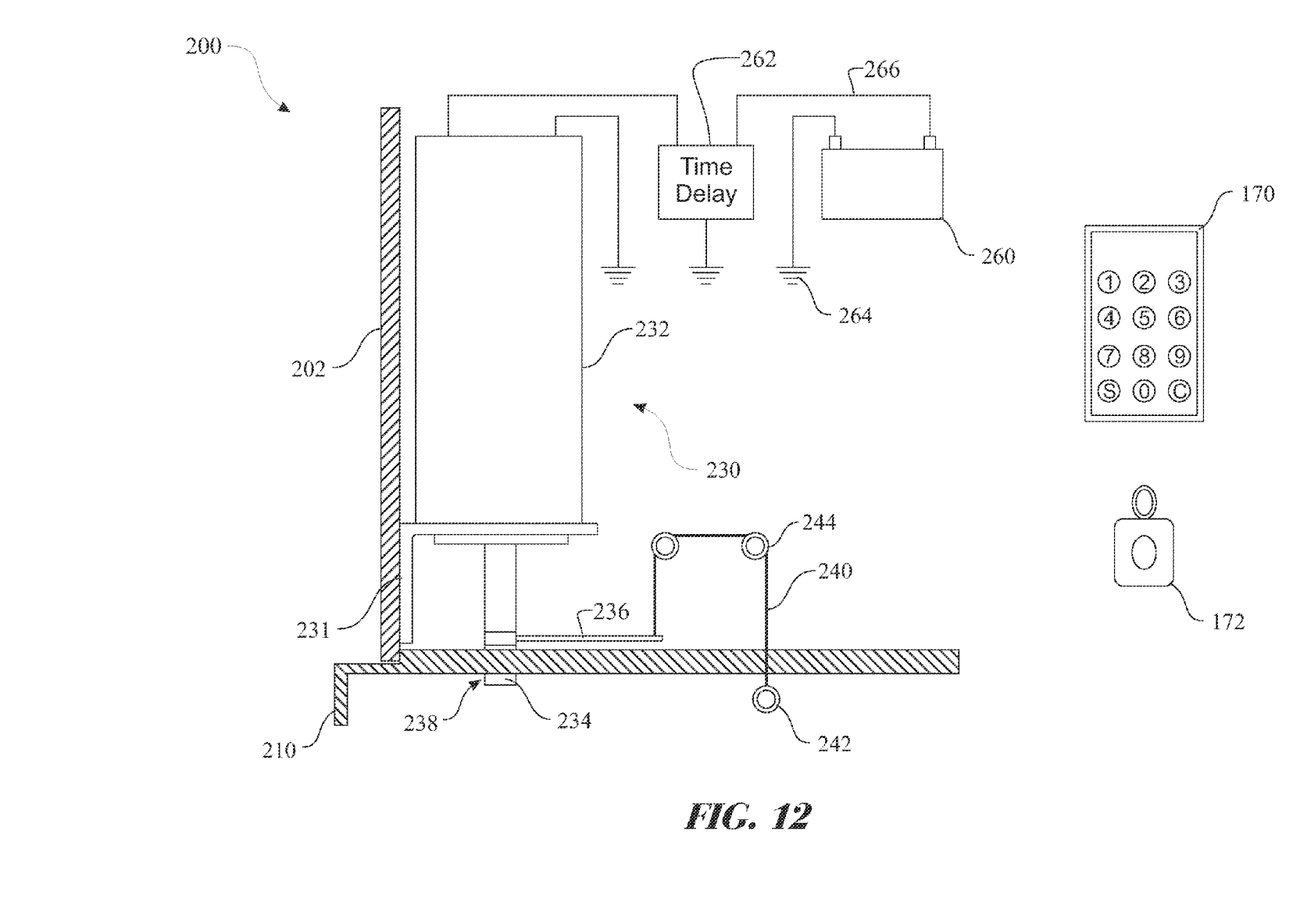
FIG. 12 presents an exemplary detailed diagram of the exemplary actuator deadbolt locking assembly incorporating an emergency release mechanism.

In an alternate embodiment, the door to frame deadbolt assembly 230 engages the primary door 202 with a doorframe 210, securing the door in a closed position. The door to frame deadbolt assembly 230 includes a deadbolt actuator 232 and a deadbolt pin 234. The deadbolt actuator 232 adjusts the deadbolt pin 234 to engage and disengage with a deadbolt receiving aperture 238 through the doorframe 210. The door to frame deadbolt assembly 230 can include a deadbolt assembly mounting bracket 231 for attaching the deadbolt actuator 232 to the primary door 202. Power is provided to the deadbolt actuator 232 via a power source 260. Power is transferred between the various components via a series of electrical cables 266. The components can be connected to a ground connection 264, such as the chassis of the cargo vehicle 100, which is commonly used. An optional time delay 262 can be provided between the power source 260 and the deadbolt actuator 232, allowing the user time to exit the vehicle prior to actuation of the deadbolt actuator 232. The door to frame deadbolt assembly 230 can be operated via a keypad remote 170 or remote operation transmitter 172 as previously described. Should a component fail in the door to frame deadbolt assembly 230, the operator would be denied access to the cargo vehicle 100. An emergency release cable 240 is secured directly or indirectly (such as via a release arm 236) to the deadbolt pin 234 allowing the user the ability to disengage the deadbolt pin 234 from the deadbolt receiving aperture 238 as needed. A release ring 242 can be provided at a distal end of the emergency release cable 240 for aiding a party in disengaging the deadbolt pin 234 from the deadbolt receiving aperture 238. The emergency release cable 240 can be guided through at least one redirecting element 244 to provide proper operative flow. Although a cable is illustrated, it is understood that any mechanical configuration can be utilized, such as a cantilever, a series of linkages, and the like. The release ring 242 can be secured via a locking bar to ensure against unauthorized disengagement.

Figure 13:
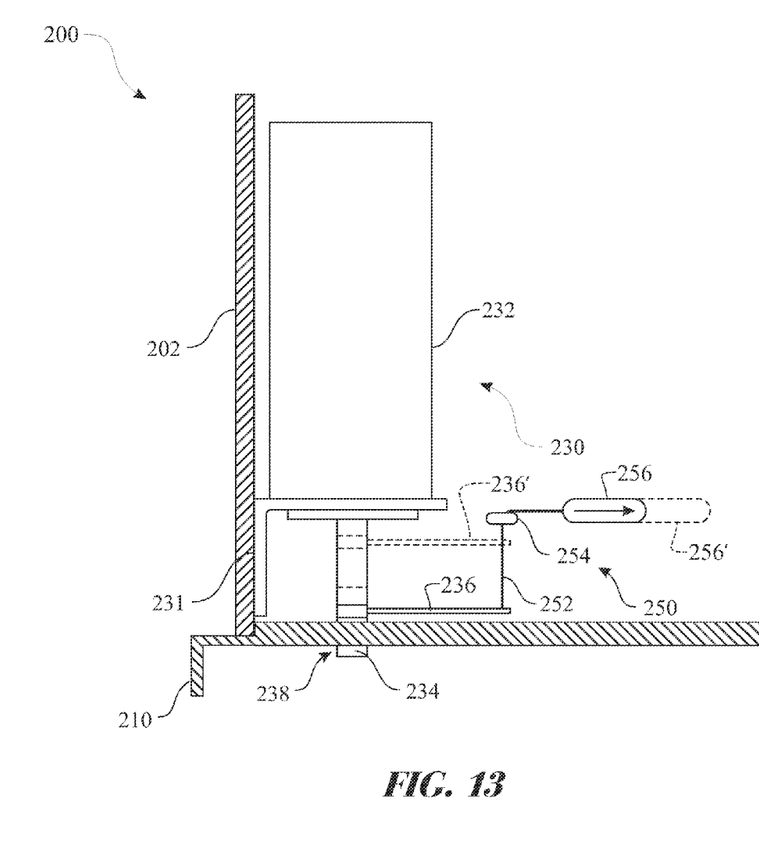
FIG. 13 presents an exemplary detailed diagram of the exemplary actuator deadbolt locking assembly incorporating an inertially operated emergency release mechanism.
Figure 14:
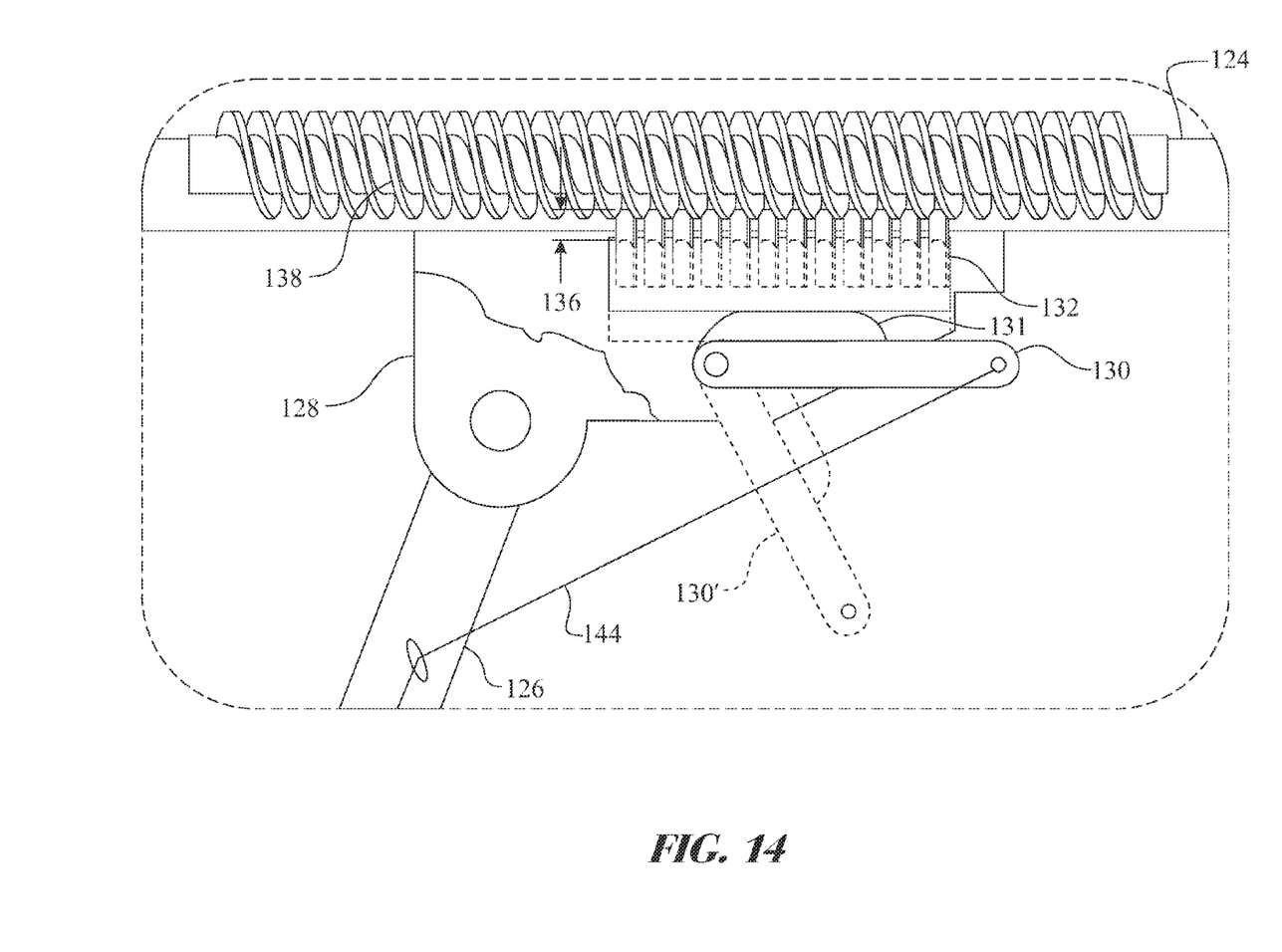
FIG. 14 presents partially sectioned side view of an exemplary linkage arm to track engaging assembly shown engaged in solid lines and disengaged in broken lines.

An inertial release mechanism 250 can be integrated with the door to frame deadbolt assembly 230 as illustrated in FIG. 13. The inertial release mechanism 250 disengages the deadbolt pin 234 by driving the release arm 236 to a position referenced as 236'. The inertial release mechanism 250 utilizes an inertial release actuator 256 positioned on or within a supporting surface (not shown). An inertial release cable 252 is attached between the inertial release actuator 256 and the release arm 236. The inertial release cable 252 can be routed through one or more inertial release cable controls 254 as needed to adequately route the inertial release cable 252. The inertial release actuator 256 moves from a set position to an inertial releasing position referenced as 256'. During an abrupt change in motion, the inertial release actuator 256 is repositioned. The inertial release actuator 256 would be of a sufficient mass to apply a tension to the inertial release cable 252, thus moving the release arm 236. The inertial release mechanism 250 can be combined with the emergency release cable 240. It is understood that an emergency release system can be integrated with an airbag activation sensor.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A cargo roll up door opening system, the system comprising:
   a roll up cargo door providing access to a cargo enclosed area of a cargo vehicle;
   an overhead door opening system comprising:
      a drive motor,
      a linear motion controlling mechanism in operational communication with the drive motor;
      a opener linkage arm linking the roll up cargo door and the linear motion controlling mechanism together in operational communication;
      a door opener carriage assembly comprising a release control element providing a removably engaging coupling between the roll up cargo door and the linear motion controlling mechanism;
      a linkage arm bracket attached to the roll up cargo door;
      a slip linkage interface provided between the linear motion controlling mechanism and the linkage arm bracket, wherein the slip linkage interface allows the opener linkage arm to move along the slip linkage independent of the roll up cargo door, and engaging to move the roll up cargo door when the opener linkage arm contacts an engagement position of the slip linkage;
      a linkage biasing member biasing the opener linkage arm towards the engagement position of the slip linkage; and
   a release mechanism operationally located external to the cargo enclosed area and in operational engagement with the disengaging linkage wherein the user can operate the release mechanism from outside the cargo enclosed area causing the disengaging linkage to disengage the coupling between the roll up cargo door and the linear motion controlling mechanism.

2. A cargo roll up door opening system as recited in claim 1, the system further comprising: a release cable providing operational engagement between the release mechanism and the release control element.

3. A cargo roll up door opening system as recited in claim 1, the system further comprising:
   an opener release handle included in the release mechanism, the opener release handle being located external to the cargo enclosed area; and
   a release operable arm located internal to the cargo enclosed area, wherein a rotation of the opener release handle rotates the release operable arm.

4. A cargo roll up door opening system as recited in claim 3, the system further comprising a lock integrated into the release mechanism.

5. A cargo roll up door opening system as recited in claim 1, the system further comprising a lock integrated into the release mechanism.

6. A cargo roll up door opening system as recited in claim 1, the system further comprising:
   an automated locking assembly, which engages to lock the roll up cargo door in position when the opener linkage arm is at a lower end of the slip linkage.

7. A cargo roll up door opening system as recited in claim 6, the automated locking assembly further comprising:
   at least one locking bar moveably assembled to the roll up cargo door proximate a cargo door vertical edge, the at least one locking bar being in operable communication with at least one of the opener linkage arm and the slip linkage.

8. A cargo roll up door opening system as recited in claim 7, the system further comprising a locking bar biasing member applying a closure biasing force to each at least one locking bar, wherein the linkage biasing member force overcomes the sum of the closure biasing forces, when the release control element is placed in a disengaged configuration.

9. A cargo roll up door opening system, the system comprising:
   a roll up cargo door providing access to a cargo enclosed area of a cargo vehicle comprising:
      a plurality of door panels, each panel being hingeably attached to an adjacent panel,
      a plurality of door wheels attached to each panel;
      a pair of door tracks, each door track having a vertical component arching into a horizontal component and being positioned adjacent to a vertical panel edge, wherein the plurality of door wheels are operationally engaged with a respective door track;
   an overhead door opening system comprising:
      a drive motor,
      a linear motion controlling mechanism in operational communication with the drive motor;
      a opener linkage arm linking the roll up cargo door and the linear motion controlling mechanism together in operational communication;
      a door opener carriage assembly detachably engaging with the linear motion controlling mechanism;
      a engagement release lever which engages and disengages the door opener carriage assembly with the linear motion controlling mechanism;
      a release control element in operational communication with the engagement release lever;
      a linkage arm bracket attached to the roll up cargo door;
      a slip linkage interface provided between the linear motion controlling mechanism and the linkage arm bracket, wherein the slip linkage interface allows the opener linkage arm to move along the slip linkage independent of the roll up cargo door, and engaging to move the roll up cargo door when the opener linkage arm contacts an engagement position of the slip linkage;
      a linkage biasing member biasing the opener linkage arm towards the engagement position of the slip linkage; and
   a release mechanism operationally located external to the cargo enclosed area and in operational engagement with the disengaging linkage wherein the user can operate the release mechanism from outside the cargo enclosed area causing the disengaging linkage to disengage the coupling between the roll up cargo door and the linear motion controlling mechanism.

10. A cargo roll up door opening system as recited in claim 9, the system further comprising: a release cable providing operational engagement between the release mechanism and the release control element.

11. A cargo roll up door opening system as recited in claim 9, the system further comprising:
   an opener release handle included in the release mechanism, the opener release handle being located external to the cargo enclosed area; and
   a release operable arm located internal to the cargo enclosed area, wherein a rotation of the opener release handle rotates the release operable arm.

12. A cargo roll up door opening system as recited in claim 9, the system further comprising a lock integrated into the release mechanism.

13. A cargo roll up door opening system as recited in claim 9, the system further comprising:

an automated locking assembly, which engages to lock the roll up cargo door in position when the opener linkage arm is at a lower end of the slip linkage.

14. A cargo roll up door opening system as recited in claim 13, the automated locking assembly further comprising:
   at least one locking bar moveably assembled to the roll up cargo door proximate a cargo door vertical edge, the at least one locking bar being in operable communication with at least one of the opener linkage arm and the slip linkage.

15. A cargo roll up door opening system as recited in claim 14, the system further comprising a locking bar biasing member applying a closure biasing force to each at least one locking bar, wherein the linkage biasing member force overcomes the sum of the closure biasing forces, when the release control element is placed in a disengaged configuration.

16. A cargo roll up door opening system, the system comprising:
   a roll up cargo door providing access to a cargo enclosed area of a cargo vehicle;
   an overhead door opening system comprising:
      a drive motor,
      a linear motion controlling mechanism in operational communication with the drive motor;
      a opener linkage arm linking the roll up cargo door and the linear motion controlling mechanism together in operational communication;
      a door opener carriage assembly comprising a release control element providing a removably engaging coupling between the roll up cargo door and the linear motion controlling mechanism;
      a linkage arm bracket attached to the roll up cargo door;
      a slip linkage interface provided between the linear motion controlling mechanism and the linkage arm bracket, wherein the slip linkage interface allows the opener linkage arm to move along the slip linkage independent of the roll up cargo door, and engaging to move the roll up cargo door when the opener linkage arm contacts an engagement position of the slip linkage;
      a linkage biasing member biasing the opener linkage arm towards the engagement position of the slip linkage; and
      a release mechanism operationally located external to the cargo enclosed area and in operational engagement with the disengaging linkage wherein the user can operate the release mechanism from outside the cargo enclosed area causing the disengaging linkage to disengage the coupling between the roll up cargo door and the linear motion controlling mechanism,
   wherein said release mechanism comprises a release handle, the release handle being rotationally assembled to an exterior of the cargo door.

17. A cargo roll up door opening system as recited in claim 16, the system further comprising: a release cable providing operational engagement between the release mechanism and the disengaging linkage.

18. A cargo roll up door opening system as recited in claim 16, the system further comprising:
   an automated locking assembly which engages to lock the roll up cargo door in position when the opener linkage arm is at a lower end of the slip linkage; and
   wherein the automated locking assembly comprises at least one locking bar moveably assembled to the roll up cargo door proximate a cargo door vertical edge, the at least one locking bar being in operable communication with at least one of the opener linkage arm and the slip linkage.

19. A cargo roll up door opening system as recited in claim 18, the system further comprising a locking bar biasing member applying a closure biasing force to each at least one locking bar, wherein the linkage biasing member force overcomes the sum of the closure biasing forces, when the release control element is placed in a disengaged configuration.

20. A cargo roll up door opening system as recited in claim 16, the system further comprising a lock integrated into the release mechanism.

* * * * *